Jan. 11, 1966   P. F. FINNEY ETAL   3,229,242
THERMOCOUPLE CONNECTOR
Filed Feb. 11, 1964   4 Sheets-Sheet 1
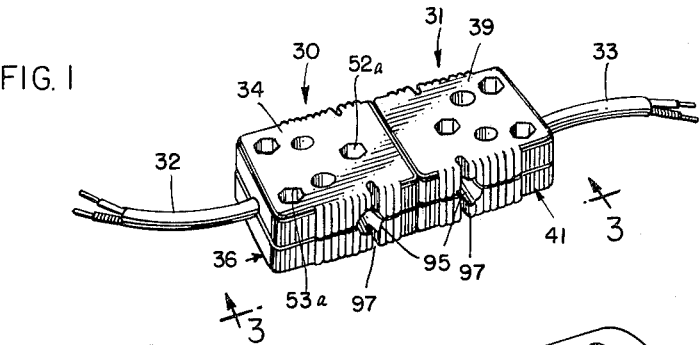
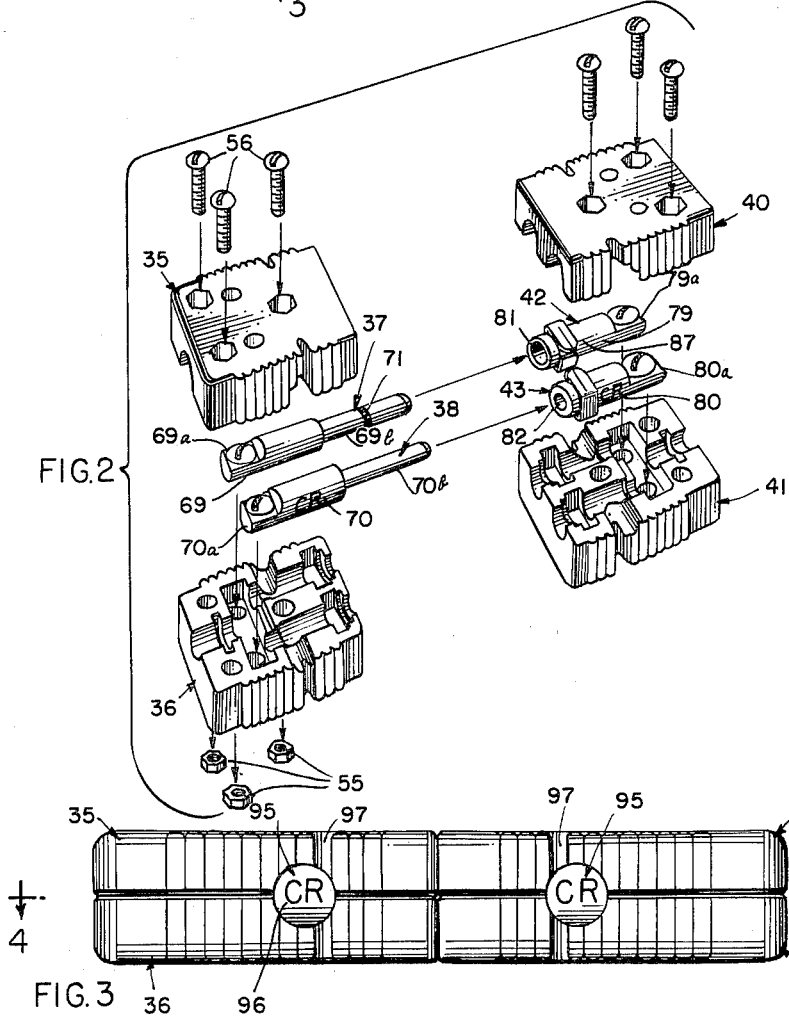
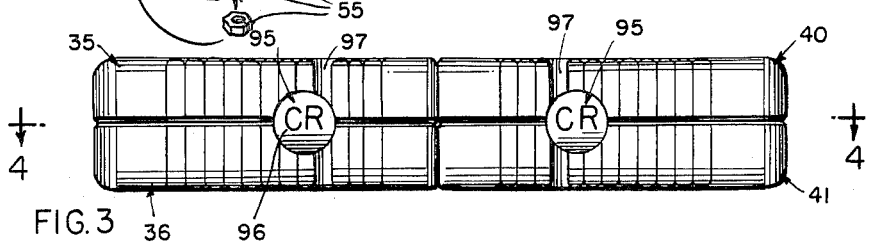
INVENTORS:
PHILIP F. FINNEY
RONALD E. HOEPNER
BY
ATT'YS Jan. 11, 1966     P. F. FINNEY ETAL     3,229,242
THERMOCOUPLE CONNECTOR
Filed Feb. 11, 1964     4 Sheets-Sheet 2
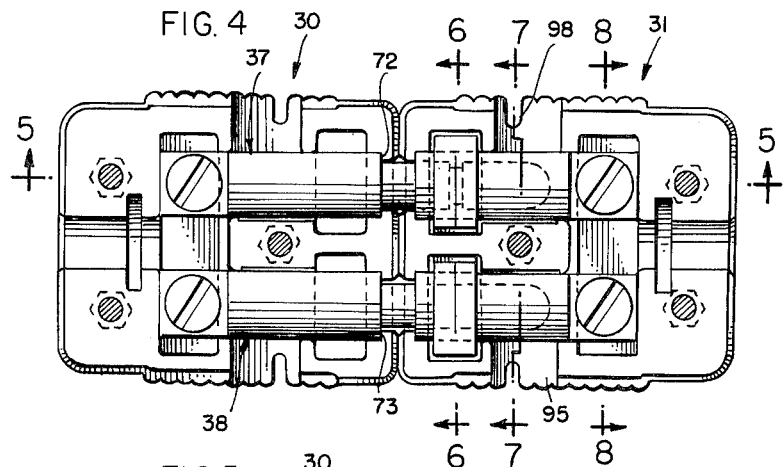
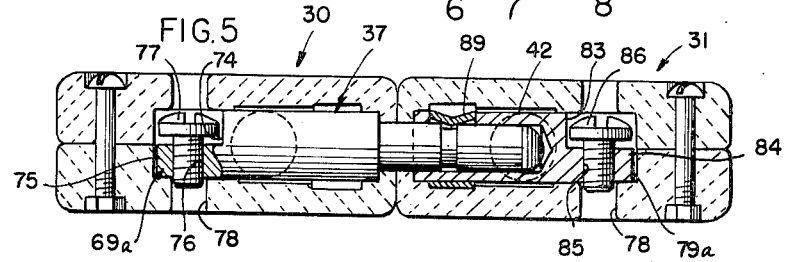
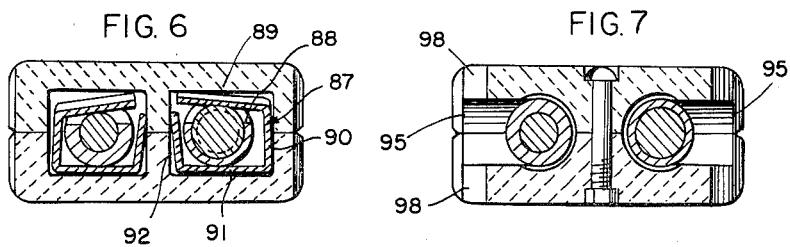
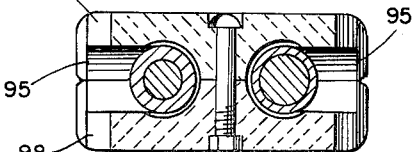
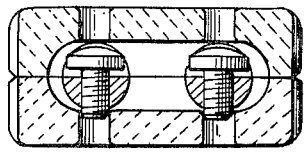
INVENTORS:
PHILIP F. FINNEY
RONALD E. HOEPNER
BY *Marzall, Johnston, Cook & Root*
ATT'YS Jan. 11, 1966  P. F. FINNEY ETAL  3,229,242
THERMOCOUPLE CONNECTOR
Filed Feb. 11, 1964  4 Sheets-Sheet 3
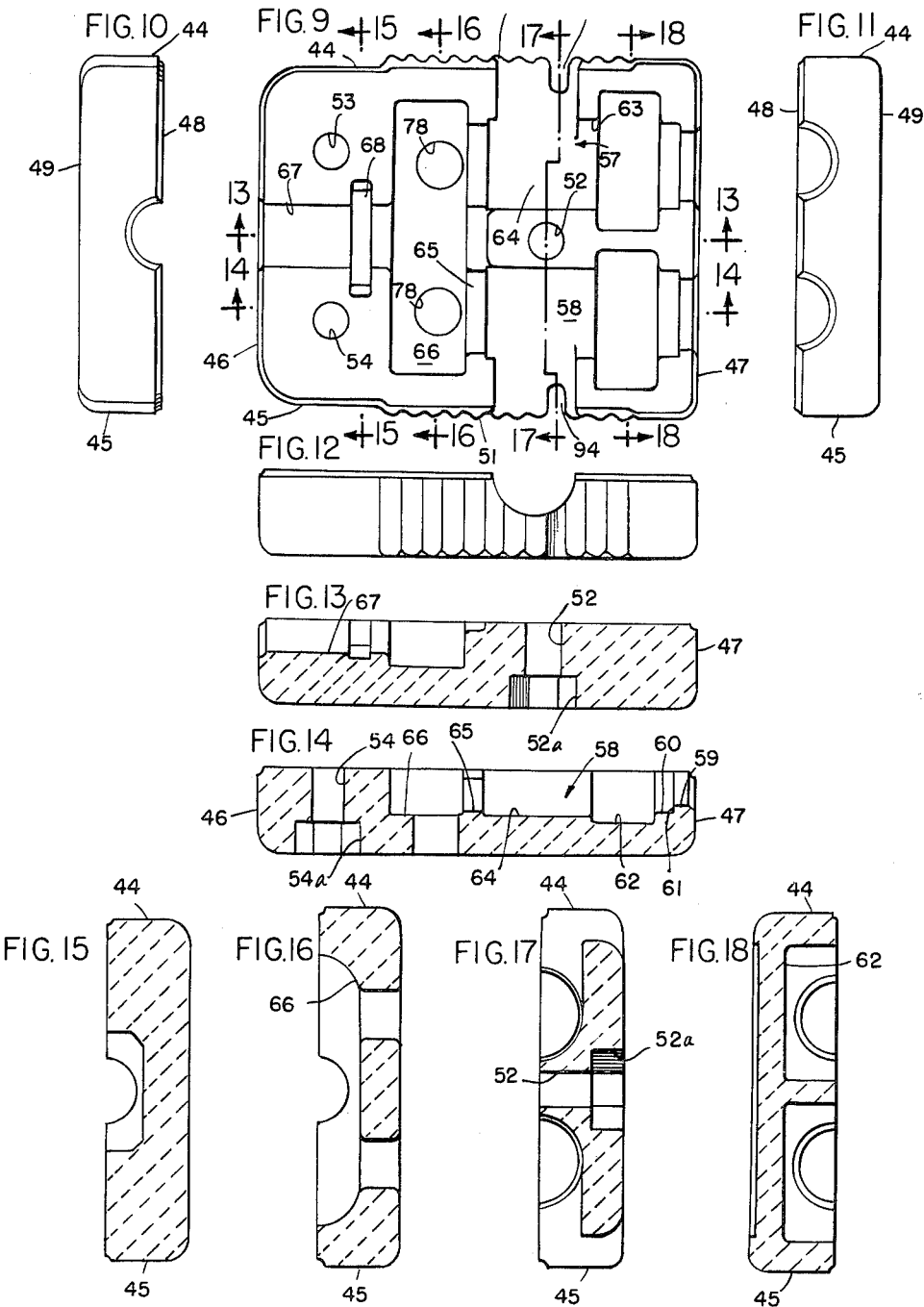
INVENTORS:
PHILIP F. FINNEY
RONALD E. HOEPNER
BY
Marzall, Johnston, Cook & Root
ATT'YS

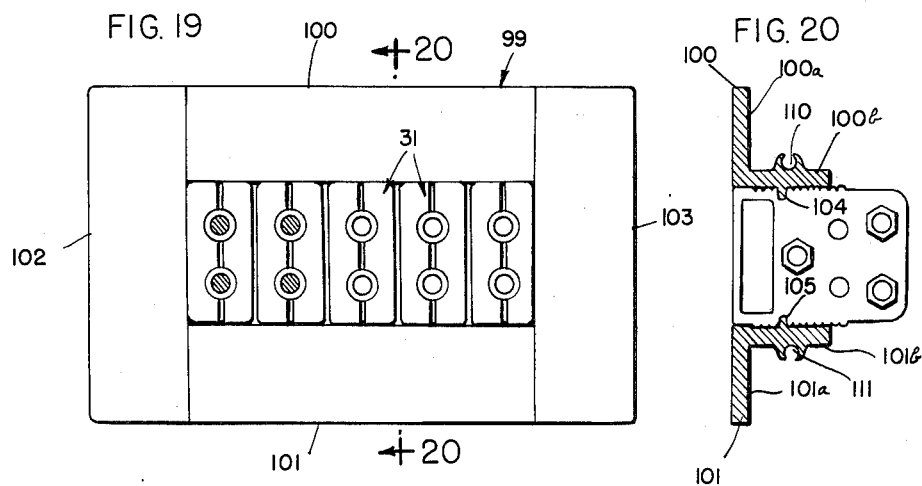
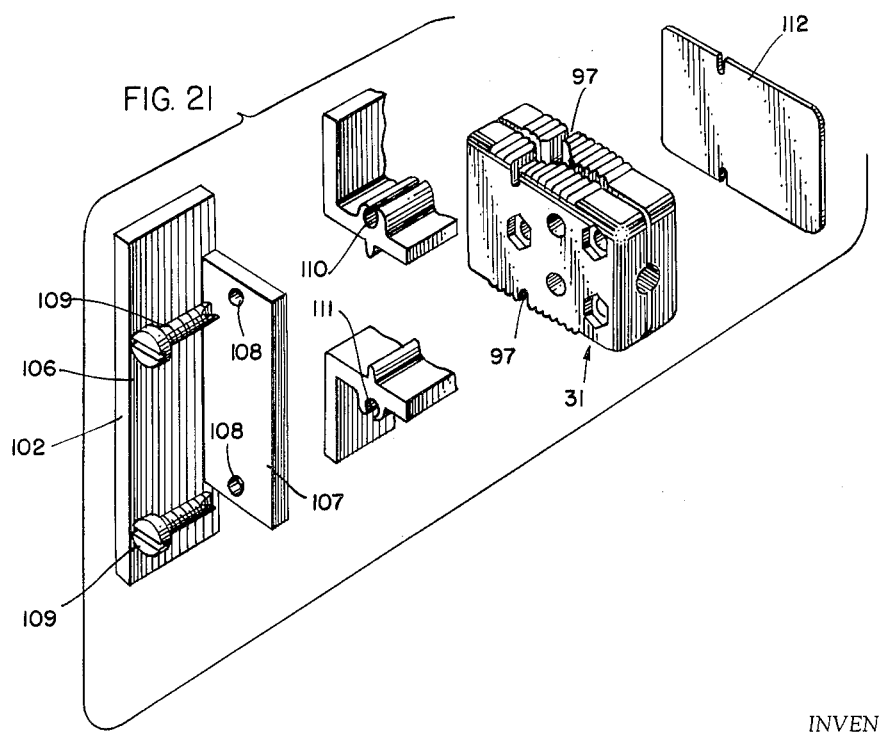

United States Patent Office 3,229,242
Patented Jan. 11, 1966

3,229,242
THERMOCOUPLE CONNECTOR
Philip F. Finney and Ronald E. Hoepner, Villa Park, Ill., assignors to Thermo-Couple Products Company, Inc., Villa Park, Ill., a corporation of Illinois
Filed Feb. 11, 1964, Ser. No. 344,132
4 Claims. (Cl. 339—184)

This invention relates in general to a thermocouple connector for providing quick connect and disconnect means between a thermocouple sensing unit and a thermocouple measuring unit, and more particularly to a thermocouple connector capable of maintaining polarity.

The thermocouple connector of the present invention is constructed particularly of such materials that it is capable of withstanding high temperature applications and nuclear radiation, while at the same time being easy to use and maintain. This connector includes a male half and a female half, each of which includes a casing and contact members. The casing of each half comprises a pair of identical mating connector covers of ceramic material. Therefore, each casing is identical and interchangeable which thereby greatly reduces tooling and manufacturing costs. The male half is provided with a pair of male contact members having wire connecting means at one end within the casing and prong means at the other end projecting from the casing. One of the prongs is larger than the other, and the contact members are of different materials. Similarly, the female contact members are of different material and are arranged to mate with the like material of the male half. Each female contact member includes a wire connecting means at one end within the casing and prong socket receiving means also within the casing. The socket of one of the female contact members is larger than the other and constructed to mate with the larger male prong in order to insure and maintain polarity. Self wiping means is provided on each of the female contact members which wipingly engage the prongs of the male contact members when the connector halves are assembled to remove any oxidation from the prongs and thereby insure the best possible electrical contact. In order to further check the material of each contact member, a symbol is suitably provided on each member and viewing ports are formed in the casings to expose the symbol identification for the user.

Inasmuch as thermocouple connectors are quite often used in ganged arrangement, means is provided on the casing to facilitate use of frame means for mounting a plurality of connector halves together.

Accordingly, it is an object of this invention to provide an improved thermocouple connector that may be used in a thermocouple circuit as a quick connect and disconnect means, and which will maintain polarity when connected and will provide a check to determine that proper connector halves are placed together.

Another object of this invention resides in a thermocouple connector that is capable of withstanding high temperature applications and nuclear radiation.

Still another object of this invention resides in the provision of a thermocouple connector including a male half and a female half, each of which is provided with a casing and contact members, wherein the casing of each half is identical thereby greatly reducing tooling and manufacturing costs to provide a more economically constructed connector.

A further object of this invention is to provide a thermocouple connector having a male and female half, each of which includes casings and contact members, wherein means is provided for self wiping the contact members upon assembling thereof in order to define the best possible electrical contact.

A still further object of this invention is in the provision of a thermocouple connector that is capable of being quickly and easily mounted in ganged relation with other identical connectors for use on instrument panels and the like.

Another object of the present invention is to provide a thermocouple connector that can be quickly and easily assembled and disassembled with conducting wires in order to facilitate overall handling problems.

Still another object of this invention resides in the provision of a thermocouple connector, wherein the connector includes male and female halves, each of which is provided with casings and contact members, and wherein the contact members in one half are of different material but of matching material with those to be engaged in the other half, and further wherein identification of the contact member material is stamped or otherwise affixed thereto and viewing portions are provided in the casings to directly view and identify the contact members thereby giving an absolute check on the materials employed in each connector half.

Other objects, features and advantages of the invention will be apparent from the following detailed disclosure, taken in conjunction with the accompanying sheets of drawings, wherein like reference numerals refer to like parts, in which:

FIG. 1 is a perspective view of the thermocouple connector of the present invention illustrating the male and female halves in assembled relationship;

FIG. 2 is an exploded view of the connector of FIG. 1, with the wires removed and showing some small parts in assembled relation;

FIG. 3 is a side elevational view of the connector of FIG. 1 and taken substantially along line 3—3 thereof, and illustrating the viewing ports which permit positive identification of the materials used for the contact members;

FIG. 4 is a longitudinal plan view of the lower connector covers of each connector half in assembled relationship and showing the male and female contact members arranged on the connector halves;

FIG. 5 is an elevational sectional view of the connector halves, taken substantially along line 5—5 of FIG. 4;

FIG. 6 is a transverse sectional view taken substantially along line 6—6 of FIG. 4 and illustrating the self wiping means;

FIG. 7 is a transverse sectional view taken substantially along line 7—7 of FIG. 4;

FIG. 8 is a transverse sectional view taken substantially along line 8—8 of FIG. 4;

FIG. 9 is a plan view of a single connector cover with the contact members removed and looking at the interior thereof;

FIG. 10 is an end elevational view of the connector half and looking in the direction of the wire opening;

FIG. 11 is an end elevational view of the connector half of FIG. 9 and looking in the direction of the contact member openings;

FIG. 12 is a side elevational view of the connector cover;

FIG. 13 is a longitudinal sectional view taken substantially along line 13—13 of FIG. 9;

FIG. 14 is a longitudinal sectional view taken substantially along line 14—14 of FIG. 9;

FIG. 15 is a transverse sectional view taken substantially along line 15—15 of FIG. 9;

FIG. 16 is a transverse sectional view taken substantially along line 16—16 of FIG. 9;

FIG. 17 is a transverse sectional view taken substantially along line 17—17 of FIG. 9;

FIG. 18 is a transverse sectional view taken substantially along line 18—18 of FIG. 9;

FIG. 19 is a front elevational view of a frame means and mounting a plurality of connector halves in ganged relation;

FIG. 20 is a vertical sectional view of the arrangement of FIG. 19 and taken substantially along line 20—20 of FIG. 19; and FIG. 21 is a partially exploded view of the frame means and one connector half of the arrangement of FIG. 19 and showing some parts in broken form for purposes of clarity.

Referring now to the drawings and particularly to FIG. 1, the thermocouple connector of the present invention includes generally a male half 30 and a female half 31 capable of being quickly connected and disconnected. A set of wires 32 extend from the male half 30, while a set of wires 33 extend from the female half 31 and are provided to connect the connector into a thermocouple circuit. As an example of use, the wires 33 may be connected to a thermocouple sensing unit, while the wires 32 may be connected to a thermocouple measuring unit, however, these connections may be reversed if so desired. In fact, where the connector is used with panel instrumentation, it is most likely that the female half 31 would be connected to the measuring unit while the male half 30 would be connected to the sensing unit.

Referring now more particularly to FIGS. 1–8, the male half 30 includes a casing 34 defined by a pair of connector covers 35 and 36, and a pair of male contact members 37 and 38. Similarly, the female half 31 includes a casing 39 defined by a pair of connector covers 40 and 41, and a pair of female contact members 42 and 43. The connector covers 35 and 36 are identical as are the connector covers 40 and 41. More particularly, each of the connector covers 35, 36, 40 and 41 are identical and interchangeable even though any pair of connector covers may receive either a pair of male contact members or a pair of female contact members or any combination thereof. Thus, as will be more clearly hereinafter explained, the female contact members 42 and 43 will fit just as well in a casing comprising the connector covers 35 and 36, or 35 and 41, or any other combination. Similarly, the male contact members 37 and 38 may be mounted in any pair of connector covers.

The connector covers are preferably of molded ceramic which thereby enables the connector of the present invention to withstand high operating temperatures and nuclear radiation. The contact members are made of any suitable material used in thermocouple circuitry, it being understood that the male contact members would be made of a different material and the female contact members would be made of a different material, but that a proper thermocouple connector would include a male half and female half which would, when assembled, match one male contact member with a female contact member of like material and the other male contact member and female contact member of like material to thereby maintain polarity and eliminate any possible errors that might be introduced wherein contact members of different materials are in engagement with each other.

Since each connector cover is identical, the details of one connector cover will be hereinafter described in particular relation to FIGS. 9–18. Each cover is generally rectangular in shape as seen in plan view (FIG. 9), and includes side walls 44, 45, end walls 46, 47, a top or upper face 48 that defines the mating face with another cover, and a lower face 49. The side walls 44 and 45 are arranged in parallel relation, and further provided thereon for a portion of their length with roughening or scallops 50 and 51, respectively, which facilitates gripping of the connector casings when assembling or disassembling male and female halves. The top and bottom faces 48 and 49 are also arranged in parallel relationship, and the top face 48 is adapted to engage in mating relationship with the top face of another connector cover to define a casing for a male or female half.

Three cylindrical bores 52, 53 and 54 extend through the cover from the mating face 48, and are each enlarged and polygonally shaped at 52a, 53a and 54a on the lower face 49. In this instance, the enlarged areas 52a, 53a and 54a are hexagonally formed to matingly receive nuts 55. The nuts 55 coact with screws or bolts 56 for securing a pair of connector covers together.

A pair of parallel side-by-side contact member channels 57 and 58 are defined in the cover opening through the mating face 48, and sized to receive either the male or female contact members. Each channel is identical in that it includes adjacent the end wall 47 a first semi-cylindrical portion 59, a second semi-cylindrical portion 60 having a greater radius and thereby defining with the first semi-cylindrical portion a semi-annular shoulder 61, an enlarged somewhat rectangular shaped cavity 62, a third semi-cylindrical surface 63 of slightly greater radius than the second surface 60, a parti-cylindrical portion 64 (substantially quarter-cylindrical), a fourth substantially semi-cylindrical portion 65 of the same dimension as the second semi-cylindrical portion 60, and a widened wire connecting means cavity 66. From the cavity 66, which may be defined as extending substantially the full width of the cover, and along the medial longitudinal line to the end wall 46, a semi-cylindrical wire receiving portion 67 is provided, and traversing said portion 67 adjacent to the cavity 66 is a groove 68 that is adapted to receive a stress relief means for the wires to be connected to the connector half.

Referring now more particularly to FIGS. 2 and 4–8, the male contact members 37 and 38 include respectively, cylindrical body portions 69 and 70 of identical size, wire connecting means 69a and 70a at one end and prong means 69b and 70b at the other end. While the length of each male connector member is identical, the diameter of the prong 69b is greater than the diameter of the prong 70b, and a locking groove 71 is provided in the prong 69b. Both prongs 69b and 70b are of a substantially reduced diametrical dimension than the cylindrical body portions 69 and 70, and therefore annular shoulders 72 and 73 are defined on each contact member. These annular shoulders engage against the shoulders 61 formed in the connector covers to prevent movement of the contact members out of the casing and through the openings defined by the first semi-cylindrical portions 59. As seen particularly in FIG. 4, the semi-cylindrical portion 59 is sized to receive in mating relation the larger prong 69b. Further, the dimensions of the second semi-cylindrical portion 60 and the fourth seim-cylindrical portion 65 are sized to matingly receive the cylindrical body portions 69 and 70 of the male contact members.

The ends of the male connector members including the wire connecting means 69a and 70a are notched at 74 to define a semi-cylindrical portion 75 having a threaded bore 76 therethrough for receiving a wire retaining screw 77. A wire may thereby be fastened to the end of the male connector member by wrapping of the wire about the screw 77 and tightening it against a semi-cylindrical portion 75. The length of the screw 77 is sufficient so that even after binding a wire to the contact member, it is free and will extend into a bore 78, FIGS. 5 and 8, that is formed in the connector cover. Engagement of the screw 77 in the bore 78 prevents rotation of a male contact member held within the casing 30. It will be appreciated that the bore 78 is sized slightly larger than the diameter of the screw 77 so that the screw may be freely received therein. The screw 77 further prevents withdrawal of the contact members from the casing. The connector covers are shown in assembled relationship in FIGS. 5–8.

The female contact members 42 and 43 include cylindrical body portions 79 and 80, respectively, of identical size and also of the same size as the cylindrical body portions 69 and 70 of the male contact members 37 and 38. Further, wire connecting means 79a and 80a are provided at one end of the female contact members 78 and 80, while prong receiving sockets 81 and 82 extend axially in the body portions 79 and 80 substantially the entire length thereof and open outwardly at the end remote from the wire connecting ends thereof. The prong receiving sockets are defined by blind bores, and the diameter of the socket 81 is greater than the diameter of the socket 82, whereby the socket 81 is adapted to receive the larger prong 69b of the male contact member 37, while the smaller socket 82 is adapted to matingly receive the smaller prong 70b of the male contact member 38. The length of the female contact members 42 and 43 is such that the socket ends abut against the shoulders 61 of the connector covers, while the wire connecting ends abut against the end of the cavities 66, thereby preventing withdrawal of the contact members from the casing.

Referring particularly to FIG. 5, the wire connecting means 79a on the female contact members is identical to the wire connecting means employed on the male connector members in that a notched portion 83 defines a semi-cylindrical portion 84 having a threaded bore 85 therein for receiving a wire retaining screw 86. Similarly, the wire retaining screw 86 has its free end receivable in the cover bore 78 to thereby prevent rotation of the contact member within the casing.

The female contact members 42 and 43 are provided with self wiping means in the form of a spring member 87 that is received and held in place by a transversely extending slot 88 formed in the body portion adjacent the socket opening end, as seen particularly in FIGS. 2 and 4–6. Each spring member 87 includes a spring arm 89 that has a V-shape cross section, FIG. 5, and which engages under some pressure the prongs of the male contact members. As seen particularly in FIG. 6, the spring members 87 are somewhat rectangular in shape and include a generally vertical portion 90 connected at its upper end to one end of the cantileverly supported spring arm 89 and at its lower end to a horizontally extending portion 91. The other end of the portion 91 is provided with an upstanding portion 92. While the spring member 87 is somewhat floatingly carried by the female contact member when the connector halves are disassembled, the member is so constructed as to provide a wiping action on the prongs during assembly to break down oxides thereon and obtain good contact, and in assembled relation, the spring defines pressure contact between the male and female contact members. The somewhat rectangular-shaped cavity 62 in the connector cover affords an area for receiving the spring member 87. Moreover, the wire connecting means cavity 66 of the connector cover affords room for extending the wires from the wire connecting means ends of the contact members into the wire receiving channel 67 and out of the connector.

Extending laterally from the parti-cylindrical surface 64 of the connector cover to the side walls 44 and 45 are semi-cylindrical channels 93 and 94 that define when two connector covers are in assembled relation, as shown in FIGS. 1, 3 and 7, viewing ports 95. Identification insignia or symbol 96 is provided on the contact members in any suitable manner and in any position in alignment with the viewing ports 95. The symbol may be stamped or otherwise affixed to the contact members, preferably during the making of the members so as to properly affix the symbolic representation of the material thereto. Such facilitates the identification and checking of the materials employed in the thermocouple connectors of the present invention, wherein at a quick glance it can be determined as to the type of materials of the contact members.

Inasmuch as thermocouple connector are quite often used in ganged arrangement, the connector covers of the present invention are provided with slots 97, FIGS. 1, 3, 20 and 21, which slots are defined by mating slots 98 formed in mating connector covers of a casing. Referring now particularly to FIGS. 19–21, an illustration of mounting the female halves 31 of a plurality of connectors together in ganged relationship is shown, wherein a frame 99 is employed that may be in turn mounted on an instrument panel or the like. This frame includes upper and lower members 100 and 101 and opposing side members 102 and 103. Each of the upper and lower members 100 and 101 is angle shaped in cross section and includes vertically extending panels 100a and 101a, respectively, and horizontally extending bars 100b and 101b, respectively. The bars 100b and 101b are perpendicular to the panels 100a and 101a. The bar 100b includes a rib 104 on the underside adapted to engage in the slots 97 of the connector halves, while the lower bar 101b includes a rib 105 on its upper surface for engaging the other slot 97 on the other side of the connector half. The ribs 104 and 105 extend longitudinally of the bars 100b and 101b an in parallel relationship to the panels 100a and 101a.

The end members 102 and 103 are identical as are the upper and lower members 100 and 101, and each end member includes a vertically extending panel 106 and a mounting bar 107 extending perpendicular thereto. The mounting bar 107 is further provided with a plurality of bores 108 for freely receiving self-tapping screws 109. The self-tapping screws are in turn received in threaded engagement in formed opening means 110 and 111 of the upper and lower frame members 100 and 101, respectively. Spacer members 112 of any desired thickness and of the approximate outline of the connector halves are arranged between each connector half when it is mounted in ganged arrangement. The upper, lower and side frame members are preferably constructed of extruded aluminum although they may be formed of any other suitable material. Further, it can be appreciated that the upper and lower frame members 100 and 101 may be cut to any desired size to accommodate any number of thermocouple connector halves in one installation. The spacer members 112 may also be of aluminum or any other desired material. Thus, it can be appreciated that any number of connector halves in accordance with the present invention may be arranged together on an instrument panel or the like by the mere use of inexpensive frame members.

It will be understood that modifications and variations may be effected without departing from the scope of the novel concepts of the present invention, but it is understood that this application is to be limited only by the scope of the appended claims.

The invention is hereby claimed as follows:

1. A thermocouple connector comprising, a male half and a female half such that when joined together will maintain polarity, said male half including a casing having a pair of identical mating covers secured together and a pair of male contact members each of a different material mounted in the casing, each male contact member having a cylindrical body of the same size and received within the casing, a wire connecting means at one end of the body of each member and within the casing and a prong at the other end of the body of each member of different size and extending from one end of the casing, said female half including a casing having a pair of identical mating covers secured together and a pair of female contact members each of a different material mounted in the casing, each mating cover of said female half casing being identical to each cover of the male half casing, each female contact member having a cylindrical body of the same size and of the same size as the bodies of the male contact members, a wire connecting means at one end of the body of each member and received along with the body within the casing, a socket extending longitudinally in the body of each member from the other end thereof for receiving a prong of a male contact member, the socket of one female contact member being larger than the socket of the other female contact member, an opening extending through one end of each casing to said wire connecting means for receiving a wire therethrough to connect to said contact members, and prong wiping means mounted on each female contact member including a transversely extending spring biased arm wipingly engaging the prong upon assembly of the halves.

2. The thermocouple connector as defined in claim 1, wherein each cover member includes an outer face defining one of the outer sides of the casing, an inner mating face parallel to the outer face and adapted to engage a like face of another cover member, front and back end faces and opposing side faces, a pair of longitudinally extending contact member channels formed in the mating face and extending from the front face to a point spaced from the back face, a transversely extending wire receiving groove at the ends of the contact member channels adjacent the back face, a lead wire channel extending from the middle of said transversely extending channel to and through the back face, a prong wiping means cavity along each contact member channel, and fastener receiving bores extending from the outer face of the mating face.

3. The thermocouple connector as defined in claim 1, and each wire connecting means including a screw extending transverse the longitudinal axis of the contact member and coacting with an opening in the respective cover member to prevent rotation of the contact member relative to the casing.

4. A thermocouple connector comprising, a male half and a female half, said male half including a casing and a pair of male contact members, said casing having a pair of identical mating covers and said male contact members having wire connecting means within the casing and prongs projecting from the casing, one of said prongs being larger than the other, said female half including a casing and a pair of female contact members, said casing having a pair of mating covers identical to the mating covers of the male half, and said female contact members having wire connecting means within the casing and sockets within the casing for receiving said prongs, one of the said sockets being larger than the other, a transversely extending slot in each female contact member, self wiping means for each female contact member including a spring biased arm extending transversely of each female contact member and received in each slot and projecting into the socket thereof to wipingly engage each male contact member upon assembly of the halves, each contact member having insignia thereon identifying the material thereof, and viewing ports in the casings aligned with the insignia for positively determining the contact member material.

References Cited by the Examiner
UNITED STATES PATENTS

| | | | |
|---|---|---|---|
| 1,918,126 | 7/1933 | Peterson | 339—196 X |
| 1,956,409 | 4/1934 | Benander | 339—191 X |
| 2,410,098 | 10/1946 | Muller | 339—126 |
| 2,888,660 | 5/1959 | Fox | 339—176 X |
| 2,997,687 | 8/1961 | Walter | 339—191 |
| 3,040,289 | 6/1962 | Wicks | 339—126 |
| 3,046,516 | 7/1962 | Tymkewicz | 339—126 |
| 3,059,214 | 10/1962 | Heller | 339—184 |
| 3,066,275 | 11/1962 | Hammell | 339—176 |

FOREIGN PATENTS 355,608   6/1922   Germany.

JOSEPH D. SEERS, *Primary Examiner.*

W. DONALD MILLER, *Examiner.*